United States Patent [19]

Delfosse et al.

[11] 3,945,178
[45] Mar. 23, 1976

[54] CROP HARVESTING AND THRESHING MACHINES

[75] Inventors: Gilbert Delfosse, Mere; Jose Andiano, Vanves, both of France

[73] Assignee: Massey-Ferguson Services N.V., Curacao, Netherlands Antilles

[22] Filed: July 24, 1974

[21] Appl. No.: 491,441

[30] Foreign Application Priority Data

July 25, 1973 United Kingdom............... 35391/73

[52] U.S. Cl................. 56/14.6; 56/124; 130/27 R; 130/27 K
[51] Int. Cl.²........................................ A01D 41/06
[58] Field of Search............ 56/14.5, 14.6, 122–125; 130/27 J, 27 P, 272, 27 R, 1

[56] References Cited
UNITED STATES PATENTS

| 858,696 | 7/1907 | Anderson et al. | 56/124 |
| 2,457,680 | 12/1948 | Johnson | 130/27 K |
| 2,649,679 | 8/1953 | Hawkins | 56/158 |
| 2,771,077 | 11/1956 | Karlsson et al. | 130/27 J |
| 3,233,395 | 2/1966 | Dahl et al. | 56/158 X |

FOREIGN PATENTS OR APPLICATIONS

| 909/26 | 4/1927 | Australia | 56/122 |
| 738,194 | 10/1955 | United Kingdom | 56/123 |
| 240,362 | 5/1970 | U.S.S.R. | 56/14.6 |

*Primary Examiner*—Russell R. Kinsey
*Attorney, Agent, or Firm*—Robert L. Farris

[57] ABSTRACT

A harvesting and threshing machine having a crop collecting platform carrying a threshing cylinder extending across its full crop collecting width. Crop threshed by the cylinder passes to a straw conveyor mounted behind the cylinder which collects the threshed crop and conveys it laterally. The straw conveyor may itself effect grain separation or may pass the crop to grain separation apparatus.

9 Claims, 4 Drawing Figures

CROP HARVESTING AND THRESHING MACHINES

This invention relates to crop harvesting and threshing machines.

The currently available crop harvesting and threshing machines, which are known as combines, have reached a stage of development at which it is apparently very difficult to increase the rate and efficiency with which they can handle crop without making sacrifices in other respects. In the past, increases in output have been achieved by increasing the overall size and power of the machines. The stage has now been reached however at which the size of the machine cannot be further increased without making road transport of it impractical or illegal.

Most of the currently available self-propelled combines comprises a main body portion housing a threshing cylinder and other grain separating apparatus and having ground wheels or tracks, together with a crop gathering header which can be mounted at the front of the body portion. The header comprises a platform or table having a cutter bar or a pick-up, and an auger. In use, crop cut by the cutter bar or lifted by the pick-up is immediately conveyed inwards by the auger to a central elevator conveyor which takes the crop to the main body portion.

In the main body portion of a conventional combine, a grain crop is first threshed by a threshing cylinder at the top of the elevator and the threshed material is then passed to straw walkers which effect separation of grain from other crop material.

On account of the weight distribution in a combine arising, in part, from the presence of the header mounted in cantilever fashion on the front end of the main body portion, the main body is almost always constructed as a front wheel drive vehicle. Also, it is generally recognized that the wheels or tracks must be of relatively large size in order to provide adequate traction for a large modern combine at the fairly low ground speeds at which such machines operate.

Consequently, the threshing cylinder of a large modern combine is located between the wheels or tracks of the machine and this limits the overall length of the cylinder because the space between the wheels or tracks is limited, in some countries at least, by the legal requirements as to maximum vehicle width.

We have ascertained that the arrangement described above for feeding the crop into the combine and for threshing it inherently gives rise to inefficient grain separation due to the random alignment of the individual stems of unthreshed grain crop as they are presented to the threshing cylinder and to the thickness of the mat of crop which they form.

In U. K. patent specification No. 951,098 there is proposed threshing apparatus in which crop cut by a cutterbar is fed to a threshing cylinder located behind the cutterbar. The threshing cylinder extends across substantially the full width of the cutterbar.

The arrangement referred to in the last preceding paragraph possesses important advantages over the conventional combines referred to above. The principal advantage is that crop can be fed to the threshing cylinder in a thin uniform layer in which the alignment and relative disposition of the individual stems of unthreshed grain crop as they are presented to the threshing cylinder is more precisely controlled. This produces more efficient threshing.

However, the threshing apparatus proposed in U.K. patent specification No. 951,098 suffers from the disadvantage that under certain conditions insufficient separation of grain from straw occurs. The straw emerging from the threshing cylinder is discharged directly onto the ground. This straw inevitably contains significant amounts of unseparated grain, which is therefore lost. It is an object of the present invention to provide means for mitigating or overcoming this disadvantage while retaining the advantage referred-to above.

According to the invention there is provided a crop harvesting and threshing machine comprising a crop collecting platform, crop threshing means, the crop threshing means being mounted on the platform and being positioned to receive crop collected by the platform and extending across substantially the full crop collecting width of the platform, wherein there is provided grain separating apparatus comprising a straw conveyor, the straw conveyor being mounted on the platform and being positioned to receive the straw from the crop threshing means and being operative to convey the straw in a direction transverse to the direction of usual forward motion of the machine.

The provision of a straw conveyor as defined in the preceding paragraph allows the crop issuing from the crop threshing means to be collected and subjected to one or more stages of grain separation. Such separation may be effected either by the straw conveyor itself or, for example, in the body of a self propelled vehicle on which the crop collecting platform is mounted.

An embodiment of the invention will now be described by way of example with reference to the accompanying drawings in which.

Figure 1:
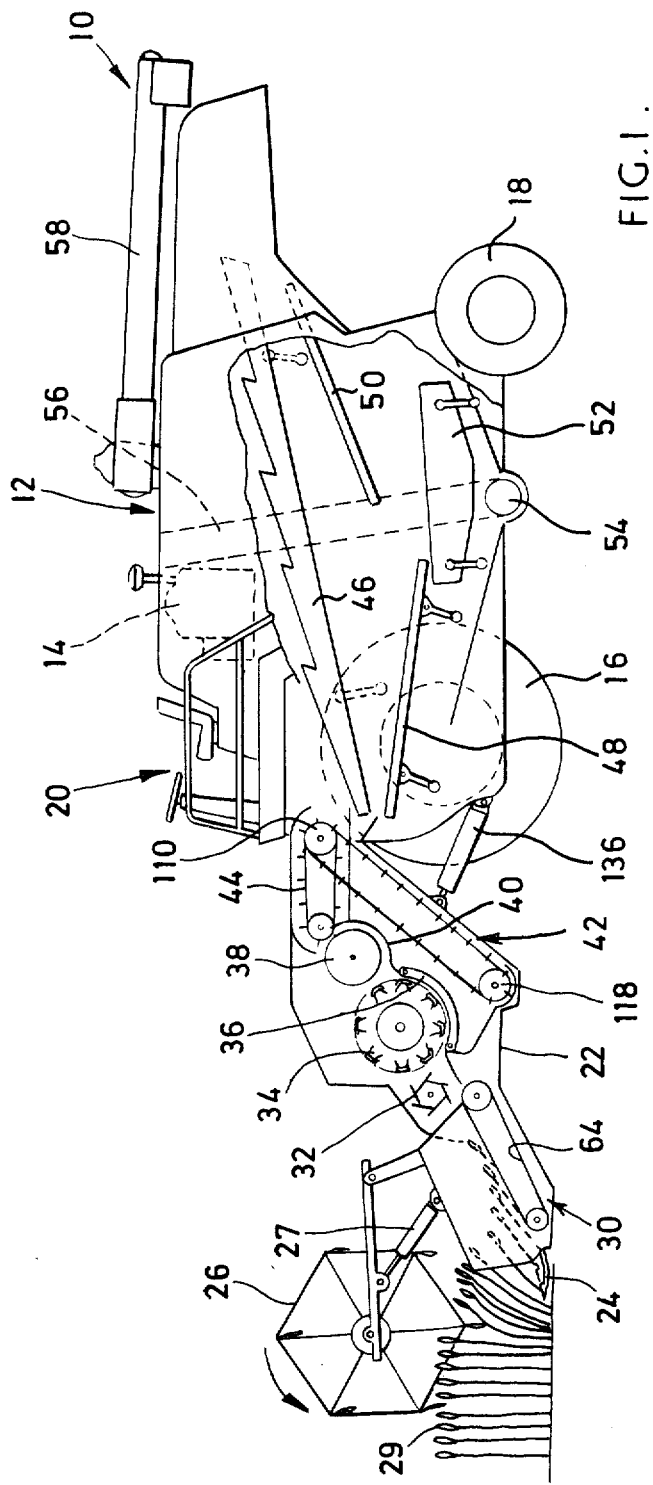
FIG. 1 is a somewhat diagrammatic side elevational view of a grain crop harvesting and threshing machine which has been partly cut-away to reveal details of the internal structure thereof.

As shown in FIG. 1 of the drawings, a self-propelled crop harvesting and threshing machine 10 comprises a body portion 12, an engine 14 mounted on the body portion, ground-engageable traction wheels 16 at the forward end of the body, and steerable wheels 18 at the rear end thereof. The machine 10 further comprises an operator's platform 20 above the traction wheels, and a crop collecting platform 22 mounted at the forward end of the body portion in a manner similar to that of a conventional header of a combine.

Figure 3:
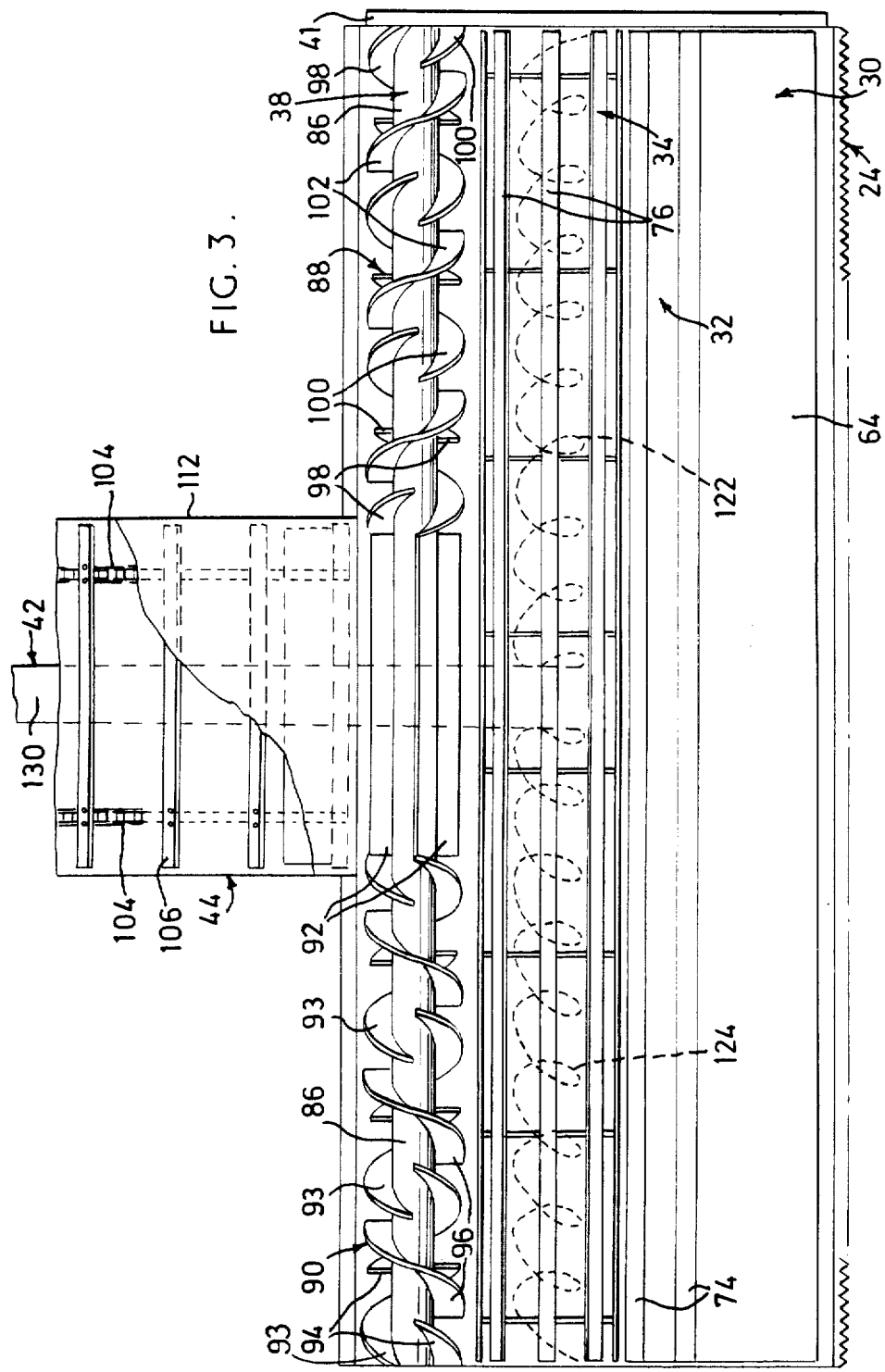
FIG. 3 shows a diagrammatic plan view of the platform of FIG. 2, partly cut-away to reveal details of its internal structure.

Platform 22 has mounted thereon crop-cutting means in the form of a cutter bar 24, crop conveying and feeding means comprising a reel 26, an endless belt-type conveyor 30 and a rotary beater 32, and crop threshing means comprising a threshing cylinder 34 and an associated open-grate concave 36. A straw conveyor is also mounted on the platform and is positioned to receive the straw from between cylinder 34 and concave 36. The straw conveyor is in the form of a rotary multi-flight auger or impellor 38 and an associated concave screen or grate member 40. Reel 26 is mounted for up and down movement under the control of a ram 27 and has a drive whereby it can be rotated at a speed such that its tines 28 feed a standing grain crop 29 head first onto conveyor 30. The drives for conveyor 30, beater 32, threshing cylinder 34 and auger 38 are enclosed by a housing 41 at the right hand end of the platform (as seen in FIG. 3).

A paddle-type undershot elevator conveyor 42, similar to the conveyors used for carrying clean grain from the shaker shoe to the grain tank in a conventional combine, is provided to carry grain separated by concave 36 and screen 40 to the body portion 12 of the harvester.

An scraper-type conveyor 44 comprising endless chains carrying transverse scraper bars is provided to carry crop material such as straw, containing unseparated grain (if any) into the body portion 12 of the harvester. Conveyor 44 is similar in structure to the elevator provided in the table elevator tunnel of a convention combine.

Body portion 12 of the harvester contains straw agitating means in the form of straw walkers 46 and associated grain pans 48, 50, and a conventional shaker shoe 52. A transverse auger 54 and an associated paddle-type elevator 56 are provided to carry clean grain from the shaker shoe to the grain tank (not shown) in the same manner as in conventional combines. An auger type unloader system for the grain tank, including a discharge tube 58 is provided in a manner well-known to those skilled in the art.

Figure 4:
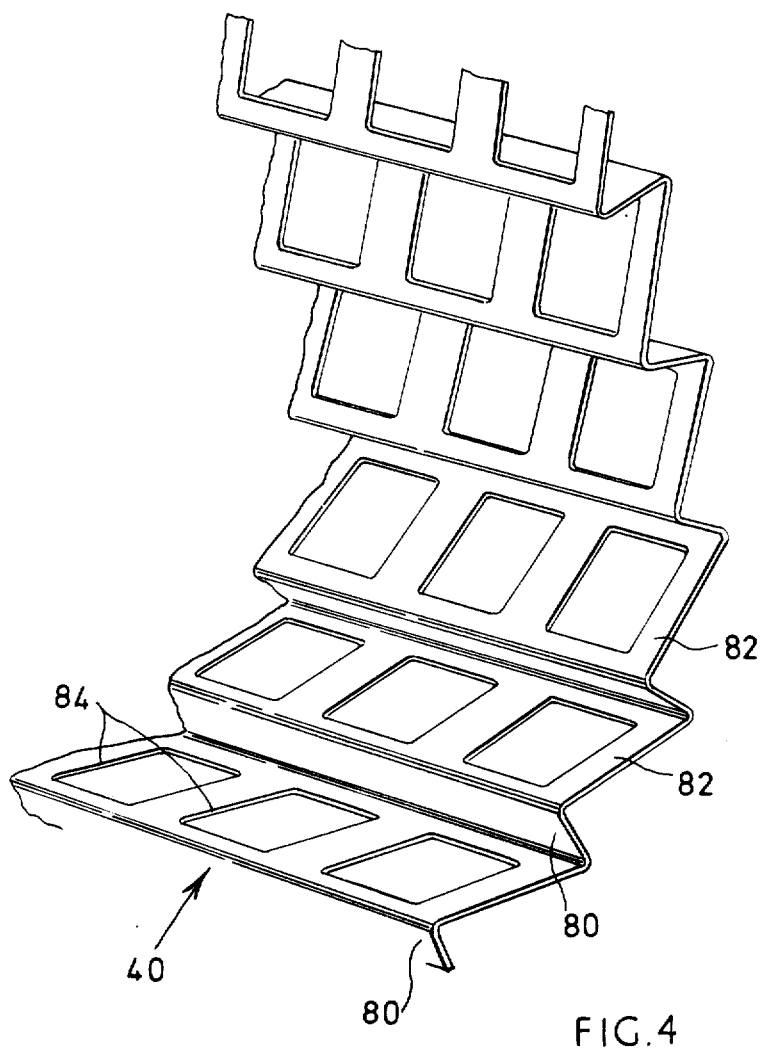
FIG. 4 shows a perspective view of a portion of a screen or grate structure of grain separating apparatus mounted on the platform.

The structure and arrangement of the crop feeding and treating apparatus mounted on crop collecting platform 22 will now be described in greater detail with reference to FIGS. 2, 3 and 4.

Cutterbar 24 is conventional in structure and is arranged to be driven from a wobble box (not shown) which oscillates a shaft 60 connected to the knife 61 of the cutter bar through a crank arm 62 and a pivoted link 63.

Conveyor 30 comprises an endless belt 64 trained around front and rear rollers 66, 68 respectively. Rear roller 68 is at a higher level than front roller 66 so that the upper run of the belt is inclined upwards, and the rear roller is driven in a direction so that the upper run moves rearwards. Front roller 66 is mounted so that it can be moved towards or away from roller 68 by means of a screw threaded adjuster 70 whereby tension in belt 64 may be changed. The belt extends across the full cutting width of cutterbar 24, as shown in FIG. 3. Feed formations such as transverse wooden slats (not shown) may be fastened to the belt on the surface thereof which is uppermost on the top run — to assist in feeding the crop.

At the discharge end of conveyor 30 a convex crop support plate 72 is provided to support the crop as it is fed towards the gap between threshing cylinder 34 and concave 36 by beater 32. The beater carries six beater plates 74 and is power rotated anti-clockwise as seen in FIG. 2. Support plate 72 and beater 32 both extend across the full working width of platform 22.

Threshing cylinder 34 and concave 36 also extend across the full working width of platform 22, but, apart from their length, these components are constructed in accordance with the well established principles for such items and the details of their structure apart from the cylinder's rub bars 76 are therefore not shown.

Concave 36 is provided with means (not shown) for adjusting its spacing from threshing cylinder 34 in the conventional manner. Such means is well known in the art and is therefore not described or illustrated.

A second convex crop support plate 78 is provided between concave 36 and grate 40 of the straw conveyor to support crop during its passage therebetween.

Figure 2:
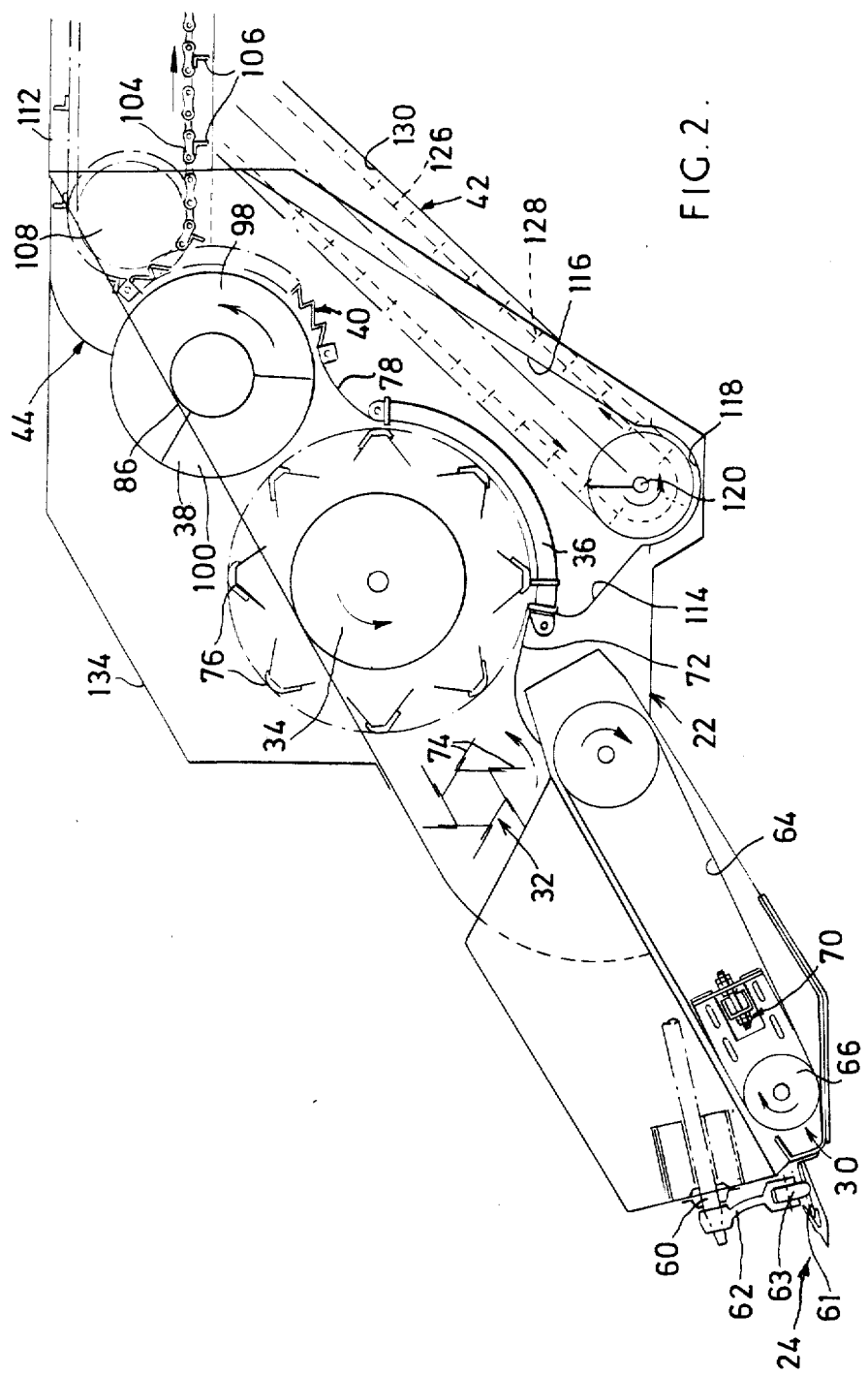
FIG. 2 shows, in a view similar to that of FIG. 1, but on a larger scale, a crop collecting platform of the harvester of FIG. 1, in greater detail.

As shown in FIG. 2, grate 40 has the same general shape as concave 36 in that it is part-cylindrical to correspond with the cylindrical volume described by auger 38 during rotation. The profile of the grate as seen in side elevation is generally similar to the teeth of a saw, and as shown in FIG. 4, the grate comprises a series of steps consisting of riser portions 80 and tread portions 82. Transversely spaced rectangular screen openings 84 are formed in tread portions 82 to allow grain to pass therethrough.

As shown in FIG. 3, auger 38 comprises a central tube 86 carrying two sets 88, 90 of short axially spaced helical auger flights at each end, and feed paddles 92 midway between its ends. The auger flights 88 are of opposite hand to the flights 90. Each set of flights 88, 90 is made up of a series of 180° flight portions, the structure and arrangement of which can best be described by analogy with a screw thread. The arrangement of flights corresponds to a three-start screw thread in which each of the three threads (corresponding to flights 93, 94, 96 and 98, 100, 102) has a 120° portion of flight removed from each 360° portion of its path around tube 86. The 120° missing flight portions are equally circumferentially displaced from each other around tube 86 i.e. they are arranged end to end. Thus the flights 93, for example, constitute portions of a single common helix having gaps therein.

At the inner end of each set of flights 88, 90 the three flights continue as the three radial feed paddles 92 which are angularly displaced 120° from each other.

The paddles 92 are arranged close to the inlet end of conveyor 44. The chains 104 and scraper bars 106 of the conveyor are trained round a driven drum 108 at the inlet end and a driving drum 110 (see FIG. 1) at the outlet end of the conveyor. The conveyor is mounted in a generally horizontal rigid casing 112 similar in structure to the table elevator tunnel of a conventional combine.

Below concave 36 and grate 40, sloping sheet metal panels 114,116 extending across the full width of platform 22 are provided to guide separated grain to common grain collecting means in the form of an auger trough 118 in which is provided a grain auger 120. As indicated diagrammatically in FIG. 3, auger 120 comprises portions 122 and 124 with flights of opposite hand to feed grain inwardly from both ends of the platform 22 to the central grain elevator 42. As indicated in FIG. 2, conveyor 42 comprises an endless driven chain 126 carrying paddles 128 which convey grain over the lower surface of a casing 130 and deliver it to grain pan 48 (see FIG. 1) in the body portion 12 of the harvesting and threshing machine.

As indicated in FIG. 2, threshing cylinder 34 and auger 38 are covered by a lid 134 to minimize dust dispersal and crop losses. The lid is not shown in FIG. 3 so as to reveal the structure below it.

From FIG. 1 it will be seen that platform 22 and the apparatus mounted on it is mounted for pivotal up and down movement about the axis of drum 110 under the control of a pair of hydraulic rams 136 to vary the height of cut of cutterbar 24 in the usual manner.

Use of the harvesting and threshing machine 10 will now be described.

Reel 26 is rotated at a rate such that the linear speed in a rearward direction of its tines in the lower portion of their travel arising from rotation of the reel, is slightly greater than their linear speed in a forward direction arising from the forward motion of the harvester as a whole i.e. the net direction of movement of the tines is rearward. Consequently the standing grain crop 29 falls, head rearwards, onto conveyor 30 as it is cut by cutter bar 24.

Regardless of the stalk length of the crop, it is fed head-first in a thin uniform layer under beater 32 towards threshing cylinder 34. A large proportion of the grain is separated by passing through concave 36, and the remainder of the crop passes directly to auger 38. The two series of auger flights 88, 90 abruptly change the direction of movement of the crop through 90 degrees and push the crop in a series of short interrupted or shaking movements laterally inwards towards conveyor 44. This action effects a certain amount of supplementary threshing and the change of direction and the intermittent nature of the subsequent movement promotes thorough separation of the grain through the openings in screen 40 below the auger.

Grain which passes through concave 36 and grate 40 is guided by panels 114, 116 into auger trough 118 and conveyed laterally inwards to elevator conveyor 42 which delivers it onto the forward end of grain pan 48. The grain is thereupon treated in the same manner as in a conventional combine. Oscillating movement of pan 48 conveys the grain to shaker shoe 52. Clean grain from the shaker shoe is delivered to the grain tank (not shown) via auger 54 and elevator 56.

Crop material leaving the inner ends of auger flights 88, 90 on platform 22 is fed by paddles 92 to adjacent the lower run of conveyor 44 which delivers it onto the forward end of the straw walkers 46 which separate any remaining grain and deliver the straw to the ground at the rear of the machine in the usual manner. Grain separated by the straw walkers is fed to shaker shoe 52 by grain pans 48, 50 and after cleaning is delivered to the grain tank as described above.

It will be appreciated that after the crop has been threshed by the crop threshing means 34, 36, the straw issuing therefrom passes through grain separating apparatus providing two distinct separation stages. Firstly straw conveyor 38, 40 and secondly straw walkers 46.

The principal technical advantages of the embodiment of the invention described above are as follows:

1. Efficient crop threshing arising from the precise control of crop feed to the threshing cylinder, and from threshing over the full cutting width of platform 22.

A standing grain crop is fed straight to the threshing cylinder head first and uniformly over the whole length of the cylinder. The ears of heads of grain are threshed in the cylinder with precisely the same distribution relative to each other along the length of the cylinder as they have when standing in the field.

2. Improved separation of grain from straw arising from the provision of straw conveyor 38, 40 which effects thorough shaking of the straw firstly by changing its direction of movement through 90° and secondly by subjecting it to the intermittent pushing action of the auger flights.

3. A higher rate of harvesting is possible than in known self-propelled combines having the threshing cylinder between the traction wheels. This is because of the greater threshing and separating efficiency arising from the elimination of the restriction to crop flow represented by the relatively narrow width of the threshing cylinder.

4. Crops having long or short stalk lengths can be harvester with equal efficiency on account of the use of conveyor 30 to feed cut crop to the threshing cylinder.

Further advantages will be apparent from a consideration of the following modifications of the above embodiment which fall within the scope of the invention:

1. height of cut by cutter bar 24 may be controlled merely by mounting conveyor 30 and cutter bar 24 for angular up and down movement about the axis of rear roller 68 of the conveyor;

2. straw walkers 46 may be dispensed-with since the efficiency of grain separation provided by the apparatus on platform 22 can render further grain separation uneconomic;

3. shaker shoe 52 can be replaced by other grain cleaning means such as a cyclone separator or may be dispensed-with altogether. In the latter case the grain would be cleaned in stationary apparatus back at the farm;

4. arising from modifications 2. and 3. above, body portion 12 of the machine may be simply in the form of a self-propelled grain tank adapted to carry platform 22 and to provide power therefor. Accordingly the centre of gravity of the body portion can be much lower than usual;

5. a further development from modification 4. above is to mount the grain tank detachably on the body portion 12 whereby the body portion can be used as a vehicle for other duties and is in fact a multi-purpose self-propelled chassis;

6. platform 22 can be arranged to be mounted on body portion 12 so as to be rapidly detachable for transport purposes. The platform can be trailed in the manner of conventional combine tables during road transport;

7. rub bars 76 of threshing cylinder 34 may be of rubber or other resilient material to minimize cracking of grain in the relatively thin layer of crop fed-thereto. Alternatively the rate of rotation of cylinder 34 may be lower than is usual for threshing cylinders;

8. Crop could be collected from one end of auger 38 for further treatment, instead of being collected from the mid point along the length of the auger;

9. the use in place of cutter bar 24 of a draper or the like for picking up previously cut crop, or of row units for harvesting maize. The term "harvesting" as used in the claims is to be construed accordingly.

It is to be understood that the term "straw" as used in this specification and claims means the stalk portion of a grain crop which has been threshed — whether with an open or closed grate concave. The term "grain crops" is intended to cover such crops as soya beans as well as maize, wheat, barley and the like.

What is claimed is:

1. A crop harvesting and threshing machine including a mobile frame; a crop collecting platform attached to the mobile frame; lift means to raise and lower at least part of the platform relative to the mobile frame; a crop threshing cylinder means rotatably supported on the platform for rotation about its long axis and extending across substantially the full crop collecting width of the platform; a concave mounted adjacent to the crop threshing cylinder means and cooperable with said crop threshing cylinder means to thresh crop material received by the crop collecting platform; feed means to feed cut crop material to the crop threshing cylinder means; a grain separating apparatus including a straw conveyor mounted on the platform and extending across substantially the full crop collecting width of the crop collecting platform, said straw conveyor including flight means for moving straw in a direction parallel to the long axis of the crop threshing cylinder means, and a screen concave member cooperating with the straw conveyor to separate grain from crop material which leaves the crop threshing cylinder means; a grain cleaning means mounted on the mobile frame; conveyor means for receiving the grain separated by the grain separating apparatus and conveying the grain received to a grain cleaning means; conveyor means for receiving straw from the straw conveyor; and drive means for driving the crop treating mechanisms of the crop harvesting and threshing machine.

2. The crop harvesting and threshing machine of claim 1 wherein the flight means of said straw conveyor includes a series of helical flights spaced apart from each other.

3. The crop harvesting and threshing machine of claim 2 characterized in that each flight extends through approximately 180° degrees.

4. The crop harvesting and threshing machine of claim 2 characterized in that at least some flights constitute portions of a single common helix having gaps therein.

5. The crop harvesting and threshing machine of claim 2 characterized in that at least some of the flights constitute portions of at least two helices arranged in a manner corresponding to a multi-start screw thread, each helix having gaps therein.

6. The crop harvesting and threshing machine of claim 1 wherein the feed means to feed cut crop material to the crop threshing cylinder means is a belt type conveyor mounted on the crop collecting platform.

7. The crop harvesting and threshing machine of claim 1 wherein the concave mounted adjacent to the crop threshing cylinder is an open grate concave, and the conveyor for receiving grain separated by the grain separating apparatus also receives threshed grain which passes through said open grate concave and conveys the grain to the grain cleaning means.

8. The crop harvesting and threshing machine of claim 1 wherein a second grain separating apparatus is mounted on the mobile frame and receives straw from the straw conveyor.

9. The crop harvesting and threshing machine of claim 1 characterized in that said screen concave member is shaped to define a series of steps presenting a saw-tooth profile to said straw conveyor.

* * * * *